United States Patent
Noguchi et al.

(10) Patent No.: US 8,422,423 B2
(45) Date of Patent: Apr. 16, 2013

(54) PACKET COMMUNICATION METHOD AND MOBILE STATION

(75) Inventors: Katsuhiro Noguchi, Yokohama (JP); Masashi Kanauchi, Yokosuka (JP); Kota Fujimura, Yokosuka (JP); Shinpei Kawakatsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 692 days.

(21) Appl. No.: 12/445,305

(22) PCT Filed: Oct. 11, 2007

(86) PCT No.: PCT/JP2007/069825
§ 371 (c)(1),
(2), (4) Date: Jul. 14, 2009

(87) PCT Pub. No.: WO2008/047666
PCT Pub. Date: Apr. 24, 2008

(65) Prior Publication Data
US 2010/0074171 A1    Mar. 25, 2010

(30) Foreign Application Priority Data
Oct. 11, 2006    (JP) ................................. P2006-278174

(51) Int. Cl.
*H04W 76/02* (2009.01)
(52) U.S. Cl.
USPC .......................................... 370/328; 370/389
(58) Field of Classification Search .................. 370/328, 370/389, 335, 352, 401; 455/411, 458, 414.1, 455/403
See application file for complete search history.

(56) References Cited

U.S. PATENT DOCUMENTS

| 6,608,832 | B2 * | 8/2003 | Forslow ........................ 370/353 |
| 7,321,574 | B2 * | 1/2008 | Anttila .......................... 370/328 |
| 2002/0002041 | A1 * | 1/2002 | Lindgren et al. .............. 455/404 |
| 2002/0105943 | A1 * | 8/2002 | Womack et al. .............. 370/352 |
| 2002/0111180 | A1 * | 8/2002 | Hogan et al. .................. 455/518 |
| 2002/0122401 | A1 * | 9/2002 | Xiang et al. .................. 370/338 |
| 2002/0163906 | A1 * | 11/2002 | Diachina et al. .............. 370/349 |
| 2003/0002457 | A1 * | 1/2003 | Womack et al. .............. 370/329 |

(Continued)

FOREIGN PATENT DOCUMENTS

| JP | 5-75536 | 3/1993 |
| JP | 2000-83005 | 3/2000 |

(Continued)

OTHER PUBLICATIONS

Office Action issued on Aug. 30, 2011 in the corresponding Japanese Patent Application No. 2006-278174 (with English Translation).

*Primary Examiner* — John Blanton
(74) *Attorney, Agent, or Firm* — Oblon, Spivak, McClelland, Maier & Neustadt, L.L.P.

(57) ABSTRACT

A packet communication method of the present invention includes a step of: receiving, at a mobile station (UE), restriction information for accepting an incoming call and restricting an outgoing call; establishing, at the mobile station (UE), a control path with a packet exchange (SGSN) in response to incoming of paging for the mobile station (UE); sending, the packet exchange (SGSN), a message instructing to establish the data path via the control path; and establishing, at the mobile station (UE), the data path by calling to the packet exchange (SGSN), when the mobile station (UE) receives the message after the mobile station (UE) has received the restriction information.

4 Claims, 10 Drawing Sheets

U.S. PATENT DOCUMENTS

| | | | |
|---|---|---|---|
| 2004/0022266 A1* | 2/2004 | Greis et al. | 370/467 |
| 2004/0127238 A1* | 7/2004 | Bianconi et al. | 455/466 |
| 2004/0196826 A1* | 10/2004 | Bao et al. | 370/352 |
| 2004/0209650 A1* | 10/2004 | Pearce | 455/558 |
| 2005/0070251 A1 | 3/2005 | Satake et al. | |
| 2005/0101329 A1* | 5/2005 | Gallagher | 455/436 |
| 2005/0186948 A1* | 8/2005 | Gallagher et al. | 455/414.1 |
| 2005/0215241 A1* | 9/2005 | Okada | 455/414.1 |
| 2005/0233745 A1* | 10/2005 | Noguchi et al. | 455/433 |
| 2005/0265350 A1* | 12/2005 | Narasimha et al. | 370/395.2 |
| 2006/0234760 A1* | 10/2006 | Cheng | 455/551 |
| 2007/0223424 A1* | 9/2007 | Su et al. | 370/335 |
| 2008/0032714 A1* | 2/2008 | Suzuki et al. | 455/458 |
| 2008/0130493 A1* | 6/2008 | Kanauchi et al. | 370/229 |
| 2009/0296630 A1* | 12/2009 | Chen et al. | 370/328 |
| 2010/0291894 A1* | 11/2010 | Pipes | 455/404.2 |

FOREIGN PATENT DOCUMENTS

| | | |
|---|---|---|
| JP | 2000-115061 | 4/2000 |
| JP | 2001-78260 | 3/2001 |
| JP | 2005-94266 | 4/2005 |
| JP | 2005-109997 | 4/2005 |
| JP | 2005-277964 | 10/2005 |
| JP | 2005-295264 | 10/2005 |

* cited by examiner

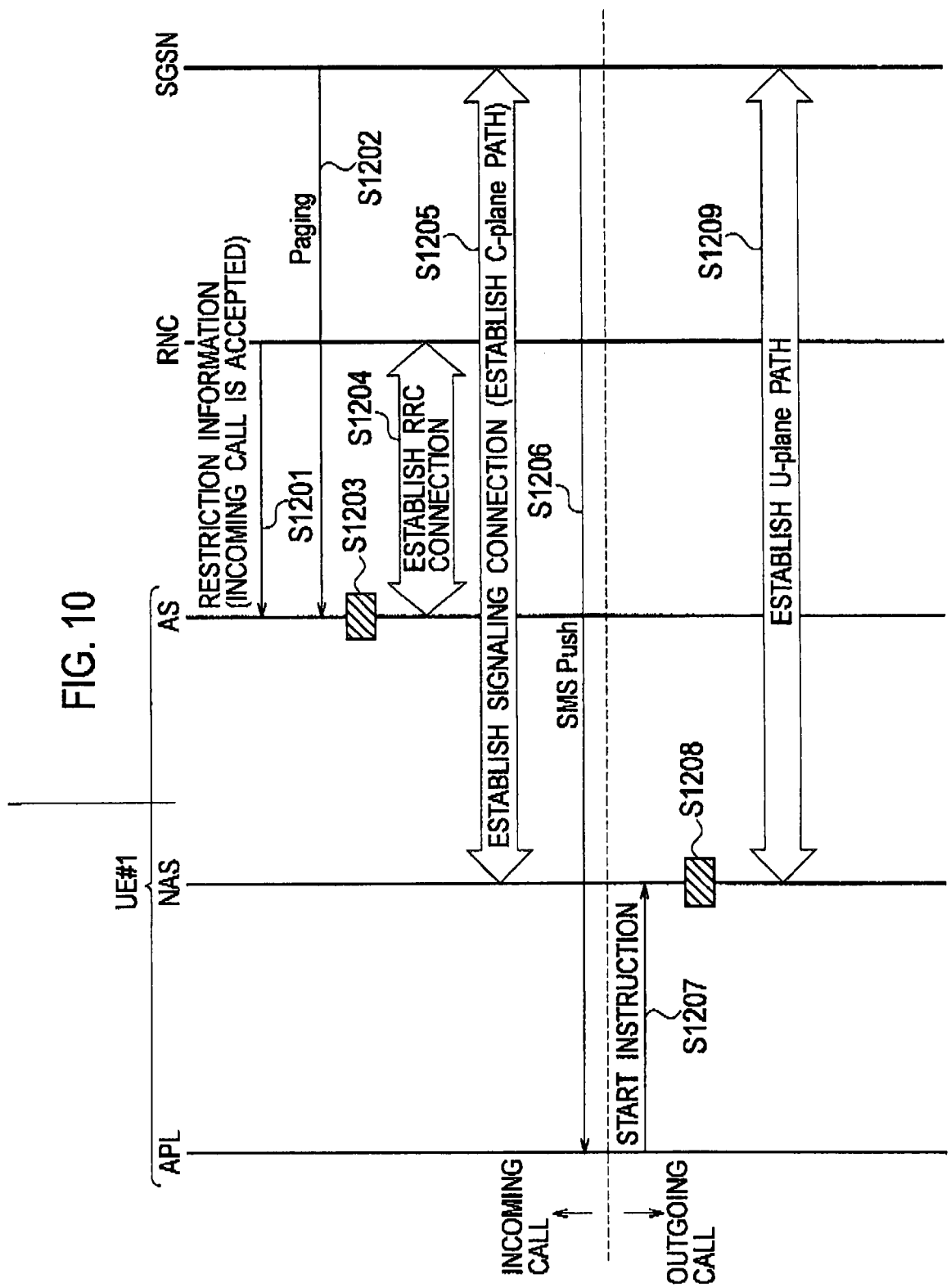

PACKET COMMUNICATION METHOD AND MOBILE STATION

TECHNICAL FIELD

The present invention relates to a packet communication method for performing packet communications via a data path established between a mobile station and a packet exchange, and the mobile station used in the packet communication method.

BACKGROUND ART

With reference to FIG. 1, a description will be given of operations of a mobile station UE for starting packet communications in response to an incoming call for the mobile station UE in a conventional packet communication system.

In Step S2001, a packet exchange SGSN sends paging for notifying the mobile station UE of the presence of an incoming call for the mobile station UE.

When noticing that the paging for the mobile station UE has been sent by the packet exchange SGSN in Step S2002, an AS (Access Stratum) function of the mobile station UE establishes a RRC (Radio Resource Control) connection with a radio network controller RNC in Step S2003.

In Step S2004, a NAS (Non Access Stratum) function of the mobile station UE establishes a signaling connection (C-plane path: control path) with the packet exchange SGSN.

In Step S2005, the packet exchange SGSN sends an "SMS (Short Message Service) Push" to the mobile station UE via the C-plane path. The "SMS Push" is a message for instructing the mobile station UE to establish a U-plane path with the packet exchange SGSN.

In Step S2006, in response to an incoming of the "SMS Push" sent by the packet exchange SGSN, an APL (Application Stratum) function of the mobile station UE sends a "start instruction" to the NAS function of the mobile station UE. The "start instruction" instructs the NAS function of the mobile station UE to establish a U-plane path with the packet exchange SGSN. Then, in Step S2007, the NAS function of the mobile station UE sends the "start instruction" to the AS function of the mobile station UE.

In Step S2008, in response to the "start instruction" received from the NAS function of the mobile station UE, the AS function of the mobile station UE calls to the packet exchange SGSN to thereby establish an RRC connection with the radio network controller RNC.

In Step S2009, when the C-plane path established in Step S2004 is now released, the NAS function of the mobile station UE establishes a C-plane path with the packet exchange SGSN.

In Step S2010, the NAS function of the mobile station UE establishes a U-plane path (data path) with the packet exchange SGSN.

Next, with reference to FIGS. 2 to 5, a description will be given of operations of a mobile station UE#1 for performing packet communications in response to an incoming call for the mobile station UE#1 when congestion occurs in the packet exchange SGSN in the conventional packet communication system.

Firstly, with reference to FIGS. 2 and 3, a first operation will be described.

As shown in FIGS. 2 and 3, in Step S3001, when detecting congestion in the packet exchange SGSN, the radio network controller RNC informs the mobile station UE#1 of restriction information for accepting an incoming call and restricting an outgoing call, namely, for restricting only PS calling (for example, VoIP (Voice over IP) communications and PoC (Push-to-Talk over Cellular) communications).

In the example of FIG. 2, the restriction information is set to restrict an outgoing call only from mobile stations each with a UE class (access class indicating a type of a mobile station) of any of "5" to "9".

Thus, a mobile station UE#3 with the UE class of "0" can accept both an outgoing call and an incoming call even when receiving the restriction information, since the restriction information does not restrict the outgoing call and the incoming call of the mobile station UE#3 with the UE class of "0".

Here, an AS (Access Stratum) function of the mobile station UE#1 receives and stores the restriction information.

In Step S3002, the packet exchange SGSN sends paging for notifying the mobile station UE#1 of the presence of an incoming call for the mobile station UE#1.

When noticing, in Step S3003, that the paging sent by the packet exchange SGSN is for the mobile station UE#1 and that the incoming of the paging is accepted in the mobile station UE#1 on the basis of the restriction information, the AS function of the mobile station UE#1 establishes an RRC connection with the radio network controller RNC in Step S3004.

In Step S3005, a NAS function of the mobile station UE#1 establishes a C-plane path with the packet exchange SGSN.

In Step S3006, the packet exchange SGSN sends an "SMS Push" to the mobile station UE#1 via the C-plane path. The "SMS Push" is a message for instructing the mobile station UE#1 to establish a U-plane path with the packet exchange SGSN.

In Step S3007, in response to the incoming of the "SMS Push" sent by the packet exchange SGSN, an APL function of the mobile station UE#1 sends a "start instruction" to the NAS function of the mobile station UE#1. The "start instruction" instructs the NAS function of the mobile station UE#1 to establish a U-plane path with the packet exchange SGSN. Then, in Step S3008, the NAS function of the mobile station UE#1 sends the "start instruction" to the AS function of the mobile station UE#1.

When noticing in Step S3009 that the PS calling is restricted in the mobile station UE#1 with the UE class of "5", on the basis of the restriction information, the AS function of the mobile station UE#1 cannot call to the packet exchange SGSN in Step S3010 even if receiving the "start instruction" from the NAS function of the mobile station UE#1. This makes it impossible to establish a U-plane path with the packet exchange SGSN.

Secondly, with reference to FIG. 4, a second operation will be described. In an example of the mobile communication system in FIG. 4, assume that an "SMS Push" is sent from a CS domain while a response to the "SMS Push" is sent to a PS domain.

As shown in FIG. 4, in Step S3101, when detecting congestion in the packet exchange SGSN, the radio network controller RNC informs the mobile station UE#1 of restriction information for accepting an incoming call and restricting an outgoing call, namely, for restricting only PS calling.

Here, the AS (Access Stratum) function of the mobile station UE#1 receives and stores the restriction information.

In Step S3102, a circuit exchange MSC/VLR sends paging for notifying the mobile station UE#1 of the presence of an incoming call for the mobile station UE#1.

When noticing, in Step S3103, that the paging sent by the circuit exchange MSC/VLR is for the mobile station UE#1 and that the incoming of the paging is accepted in the mobile station UE#1, on the basis of the restriction information, the AS function of the mobile station UE#1 establishes an RRC connection with the radio network controller RNC in Step S3104.

In Step S3105, the NAS function of the mobile station UE#1 establishes a C-plane path with the circuit exchange MSC/VLR.

In Step S3106, the circuit exchange MSC/VLR sends an "SMS Push" to the mobile station UE#1 via the C-plane path. The "SMS Push" is a message for instructing the mobile station UE#1 to establish a U-plane path with the circuit exchange MSC/VLR.

In Step S3107, in response to the incoming of the "SMS Push" sent by the circuit exchange MSC/VLR, the APL function of the mobile station UE#1 sends a "start instruction" to the NAS function of the mobile station UE#1. The "start instruction" instructs the NAS function of the mobile station UE#1 to establish a U-plane path with the packet exchange SGSN.

Here, in Step S3108, the NAS function of the mobile station UE#1 generally establishes a C-plane path with the packet exchange SGSN instead of sending the "start instruction" to the AS function of the mobile station UE#1, when judging that the mobile station UE#1 has established the RRC connection with the radio network controller RNC.

However, when noticing, in Step S3108, that the PS transmission is restricted in the mobile station UE#1, the NAS function of the mobile station UE#1 cannot establish a C-plane path with the packet exchange SGSN, and cannot establish a U-plane path with the packet exchange SGSN either.

Thirdly, with reference to FIG. 5, a third operation will be described. Note that, operations of Steps S3201 to S3206 in FIG. 5 are the same as those of Steps S3001 to S3006 in FIG. 3, and therefore descriptions thereof will be omitted.

In Step S3207, in response to the incoming of the "SMS Push" sent by the packet exchange SGSN, the APL function of the mobile station UE#1 sends a "start instruction" to the NAS function of the mobile station UE#1. The "start instruction" instructs the NAS function of the mobile station UE#1 to establish a U-plane path with the packet exchange SGSN.

Here, in Step S3208, the NAS function of the mobile station UE#1 generally establishes a U-plane path with the packet exchange SGSN instead of sending the "start instruction" to the AS function of the mobile station UE#1, when judging that the mobile station UE#1 has established the C-plane path with the packet exchange SGSN.

However, when noticing, in Step S3208, that the PS transmission is restricted in the mobile station UE#1, the NAS function of the mobile station UE#1 cannot establish a U-plane path with the packet exchange SGSN.

Non-patent Document 1: 3GPP TS23.040, "Technical realization of the Short Message Service (SMS)"

DISCLOSURE OF THE INVENTION

As described above, in the conventional packet communication system, the mobile station UE#1 is configured to start packet communications by calling to the packet exchange SGSN, after receiving paging for notifying the mobile station UE#1 of the presence of an incoming call for the mobile station UE#1. Such a system has a problem that the mobile station UE#1 cannot start packet communications in response to the incoming call for the mobile station UE#1 when receiving restriction information for accepting an incoming call while restricting an outgoing call.

The conventional packet communication system has a configuration in which an "SMS Push" is resent to the mobile station UE, when the mobile station UE fails to receive the "SMS Push". However, in the above-described case, the mobile station UE does not fail to receive the "SMS Push". Accordingly, there is another problem that the mobile station UE cannot start packet communications by receiving the resent the "SMS Push", even after the restriction is released.

The present invention has been made in view of the foregoing problems. An object of the present invention is to provide a packet communication method and a mobile station for the packet communication system in which a mobile station UE#1 is configured to start packet communications by calling to the packet exchange SGSN, after receiving paging for notifying the mobile station UE#1 of the presence of an incoming call for the mobile station UE#1. The method and mobile station thus provided enable the mobile station UE#1 to start packet communications in response to an incoming call for the mobile station UE#1 even when receiving restriction information for accepting an incoming call while restricting an outgoing call.

A first aspect of the present invention is summarized as a packet communication method for performing packet communications via a data path established between a mobile station and a packet exchange, the method including the steps of: receiving, at the mobile station, restriction information for accepting an incoming call and restricting an outgoing call; establishing, at the mobile station, a control path with the packet exchange in response to incoming of paging for the mobile station; sending, the packet exchange, a message to the mobile station via the control path, the message instructing the mobile station to establish the data path with the packet exchange; and establishing, at the mobile station, the data path with the packet exchange by calling to the packet exchange, when the mobile station receives the message after the mobile station has received the restriction information.

A second aspect of the present invention is summarized as a mobile station configured to perform packet communications via a data path established with a packet exchange, the mobile station including: a restriction information receiver unit configured to receive restriction information for accepting an incoming call and restricting an outgoing call; a control path establishing unit configured to establish a control path with the packet exchange in response to incoming of paging for the mobile station; and a data path establishing unit configured to establish the data path with the packet exchange by calling to the packet exchange, wherein the data path establishing unit is configured to establish the data path with the packet exchange by calling to the packet exchange, when the data path establishing unit receives a message instructing the mobile station to establish the data path with the packet exchange after the restriction information receiver unit has received the restriction information.

According to the present invention, a mobile station is configured to be able to call to an packet exchange, when receiving a message for instructing the mobile station to establish a U-plane path with the packet exchange, even if having received restriction information for accepting an incoming call while restricting an outgoing call. Accordingly, it is possible to solve the problem that the mobile station cannot start packet communications in response to the incoming call for the mobile station even though the incoming call is accepted.

In the second aspect, the restriction information can include an access class indicating a type of a mobile station for which an outgoing call to the packet exchange is to be restricted, and the data path establishing unit can be restricted from establishing a connection of the data path with the packet exchange by calling to the packet exchange, when the restriction information receiver unit receives the restriction information including the access class to which the mobile station belongs.

As described above, the present invention can provide a packet communication method and a mobile station for the packet communication system in which a mobile station UE#1 is configured to start packet communications by calling to the packet exchange SGSN, after receiving paging for notifying the mobile station UE#1 of the presence of an incoming call for the mobile station UE#1. The method and mobile station thus provided enable the mobile station UE#1 to start packet communications in response to an incoming call for the mobile station UE#1 even when receiving restriction information for accepting an incoming call while restricting an outgoing call.

BRIEF DESCRIPTION OF THE DRAWINGS

FIG. 10 is a sequence diagram showing an incoming call processing of a mobile communication system according to a modified example 2 of the present invention when an outgoing call is restricted.

BEST MODES FOR CARRYING OUT THE INVENTION (Configuration of Packet Communication System According to First Embodiment of Present Invention)

Figure 1:
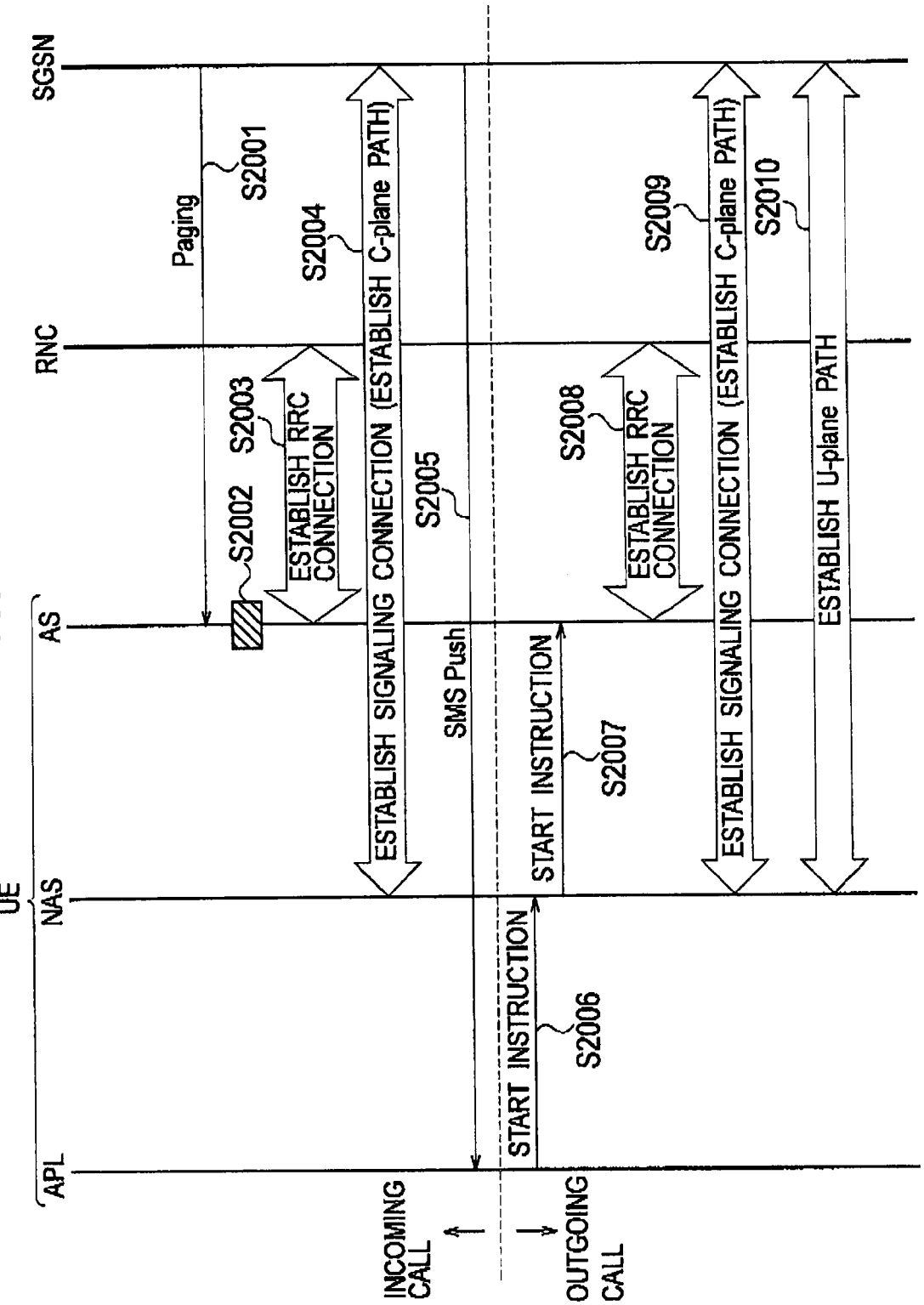
FIG. 1 is a sequence diagram showing an incoming call processing of a conventional mobile communication system when an outgoing call is not restricted.
Figure 2:
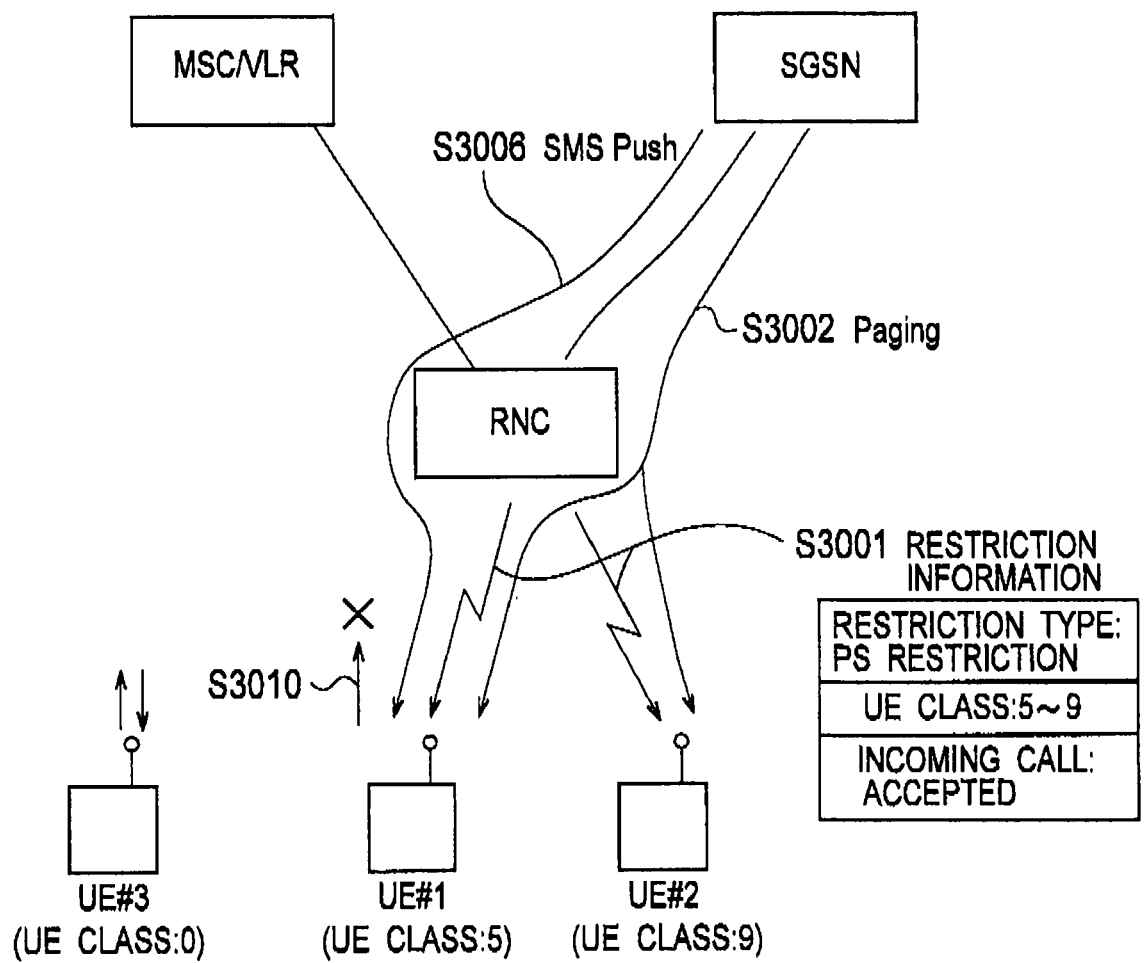
FIG. 2 is a view for illustrating an incoming call processing of the conventional mobile communication system when an outgoing call is restricted.
Figure 3:
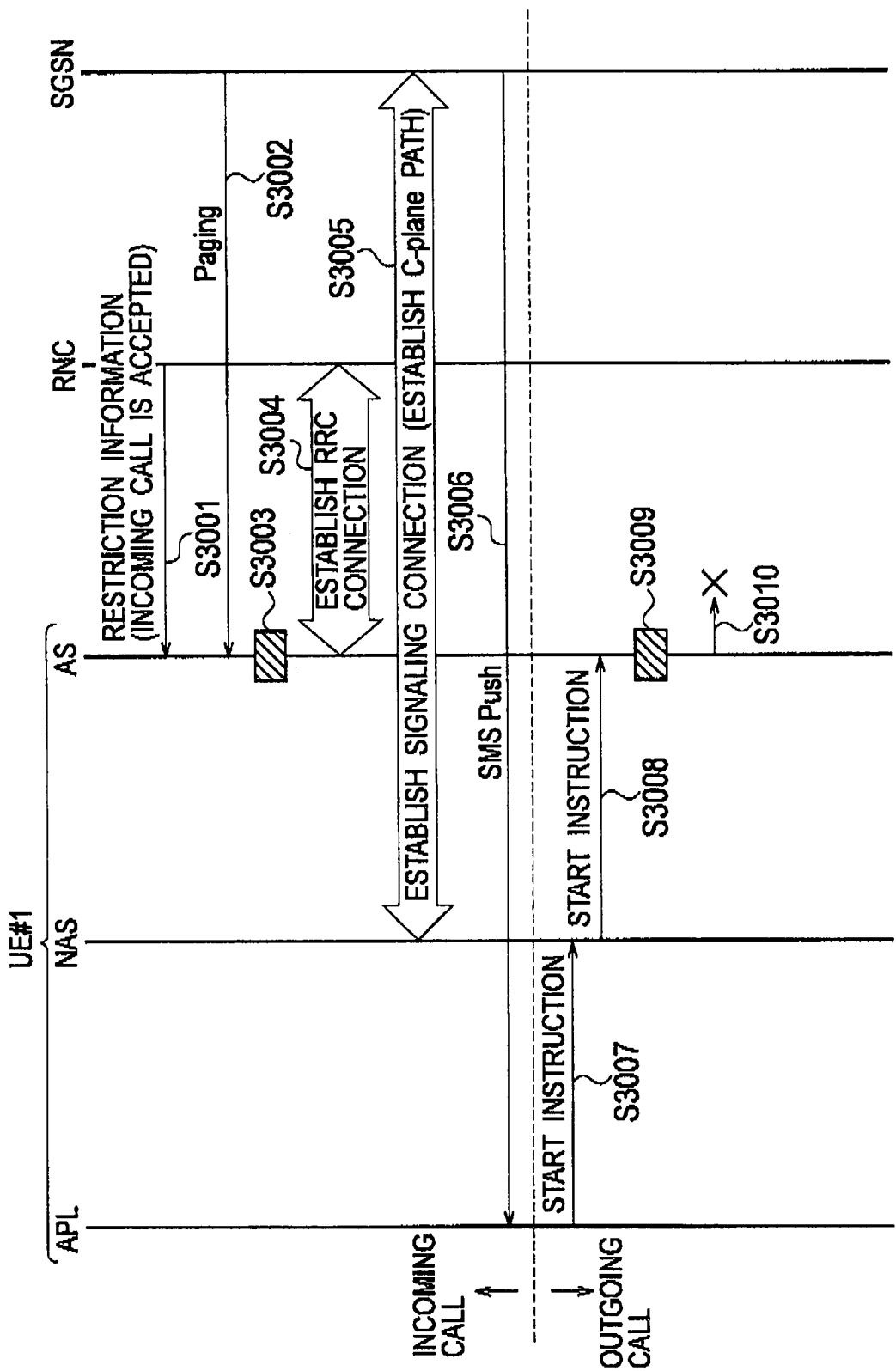
FIG. 3 is a sequence diagram showing an incoming call processing of the conventional mobile communication system when an outgoing call is restricted.

A packet communication system according to a first embodiment of the present invention has the same configuration as that of the conventional packet communication system, and hence includes, as shown in FIG. 2: a packet exchange SGSN; a circuit exchange MSC/VLR; a radio network controller RNC; a radio base station BTS (not shown); and mobile stations UE#1 to UE#3.

Note that, in the packet communication system according to this embodiment, functions of the packet exchange SGSN, the circuit exchange VLR/MSC, the radio network controller RNC and the radio base station BTS (not shown) are the same as those in the conventional packet communication system.

The mobile stations UE#1 to UE#3 according to this embodiment are each configured to perform packet communications via a C-plane path established with the packet exchange SGSN.

The mobile stations UE#1 to UE#3 according to this embodiment have the same functions. Thus, the functions of the mobile station UE#1 will be described below on behalf of the mobile stations UE#1 to UE#3.

Figure 6:
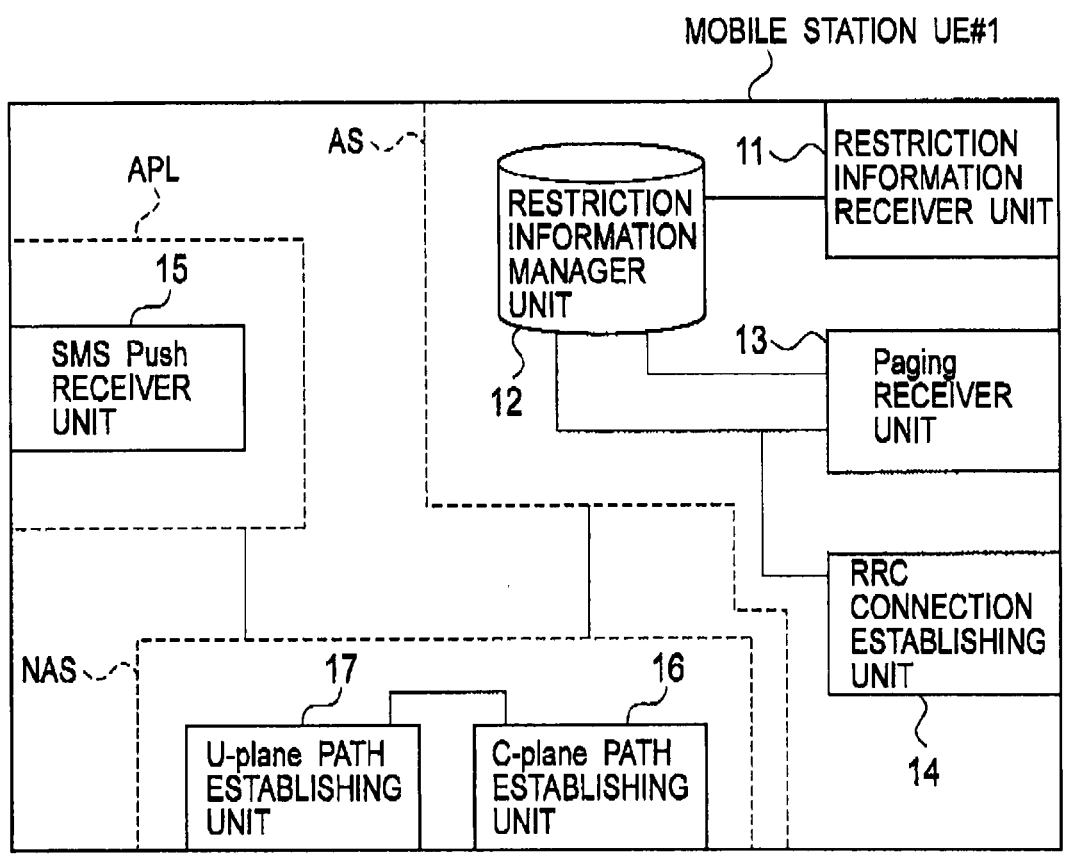
FIG. 6 is a functional block diagram of a mobile station according to a first embodiment of the present invention.

As shown in FIG. 6, the mobile station UE#1 includes: a restriction information receiver unit 11; a restriction information manager unit 12; a paging receiver unit 13; an RRC connection establishing unit 14; an SMS Push receiver unit 15; a C-plane path establishing unit 16; and a U-plane path establishing unit 17.

Here, the restriction information receiver unit 11, the restriction information manager unit 12, the paging receiver unit 13 and the RRC connection establishing unit 14 serve as an AS function; the U-plane path establishing unit 16 and the C-plane path establishing unit 17 serve as a NAS function; the SMS Push receiver unit 15 serves as an APL function.

The restriction information receiver unit 11 is configured to receive restriction information informed by the radio network controller RNC.

Here, the restriction information is configured to set a "restriction type", a "UE class", and "incoming call", as shown in FIG. 2.

The "restriction type" to be set is one of: a PS restriction restricting an outgoing call via the packet exchange SGSN; a CS restriction restricting an outgoing call via the circuit exchange MSC/VLR; and a PS/CS restriction restricting an outgoing call via both the packet exchange SGSN and the circuit exchange MSC/VLR.

The "UE class" to be set is an access class indicating a type of a mobile station whose calling to the packet exchange SGSN or the circuit exchange MSC/VLR is to be restricted.

The "incoming call" to be set is whether to restrict or accept an incoming call.

The restriction information manager unit 12 is configured to manage the restriction information received from the restriction information receiver unit 11.

The paging receiver unit 13 is configured to receive paging for notifying the mobile station UE#1 of the presence of an incoming call for the mobile station UE#1. The paging is arrived from the packet exchange SGSN.

The RRC connection establishing unit 14 is configured to establish an RRC connection with the radio network controller RNC in response to the incoming of paging for the mobile station UE#1.

The RRC connection establishing unit 14 is also configured to establish an RRC connection in response to a "start instruction" from the NAS function, by calling to the packet exchange SGSN.

Here, when the restriction information receiver unit 11 has received restriction information which includes the UE class of "5" as the class of the mobile station UE#1 and which accepts an incoming call while restricting an outgoing call, the RRC connection establishing unit 14 can call to the packet exchange SGSN to establish an RRC connection, only if the "start instruction" thus received is generated due to an "SMS Push".

Thus, the "start instruction" is configured to notify the RRC connection establishing unit 14 of whether or not the "start instruction" is generated due to the "SMS Push".

On the other hand, when the restriction information receiver unit 11 has received restriction information which includes the UE class of "5" as the class of the mobile station UE#1 as well as restricts an incoming call and an outgoing call, it is configured such that the RRC connection establishing unit 14 cannot call to the packet exchange SGSN and is hence restricted from establishing an RRC connection, irrespective of whether or not the "start instruction" thus received is generated due to the "SMS Push".

The SMS Push receiver unit 15 is configured to receive an "SMS Push" via a C-plane path. The "SMS Push" is a message for instructing the mobile station UE#1 to establish a U-plane path with the packet exchange SGSN.

Figure 7:
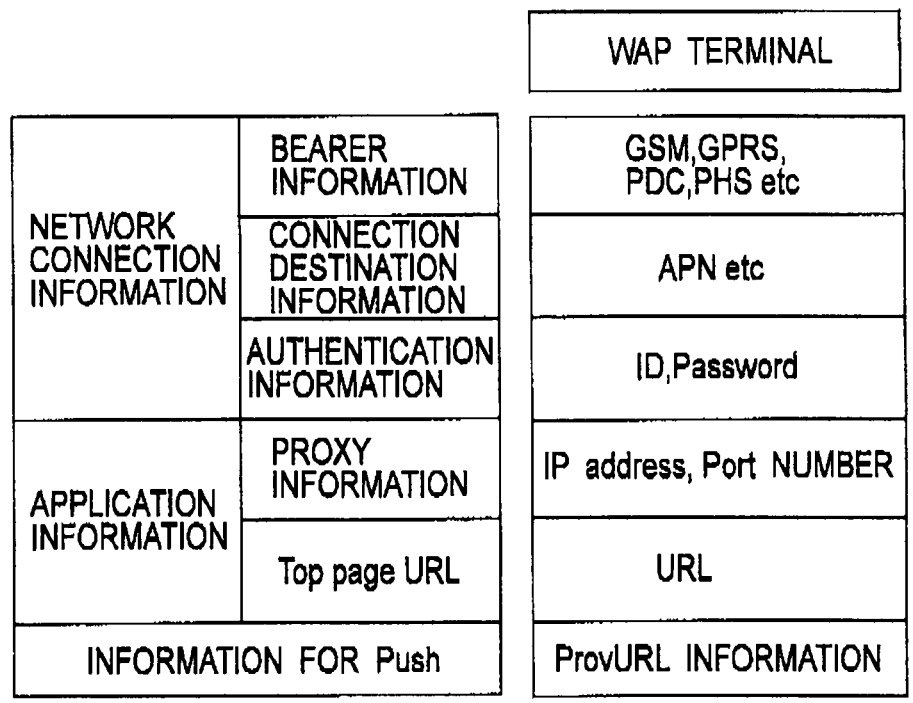
FIG. 7 is a view showing an example of a format of a "SMS Push" to be received by the mobile station according to the first embodiment of the present invention.

Here, information to be described in the "SMS Push" is defined in the "WAP Forum". For example, information shown in FIG. 7 is specified as the information to be described in the "SMS Push".

The C-plane path establishing unit 16 is configured to establish a C-plane path (control path) with the packet exchange SGSN in response to an incoming of paging for the mobile station UE#1.

The C-plane path establishing unit 16 is also configured to establish a C-plane path with the packet exchange SGSN, when the RRC connection establishing unit 14 establishes RRC connection in response to the "start instruction" from the NAS function.

The U-plane path establishing unit 17 is configured to establish a U-plane path (data path) with the packet exchange SGSN, when the C-plane path establishing unit 16 establishes a C-plane path with the packet exchange SGSN.

Specifically, the U-plane path establishing unit 17 is configured to establish a U-plane path with the packet exchange SGSN, after the RRC connection establishing unit 14 establishes the RRC connection by calling to the packet exchange SGSN, and then after the C-plane path establishing unit 16 establishes the C-plane path.

(Operations of Packet Communication System According to First Embodiment of Present Invention)

Figure 8:
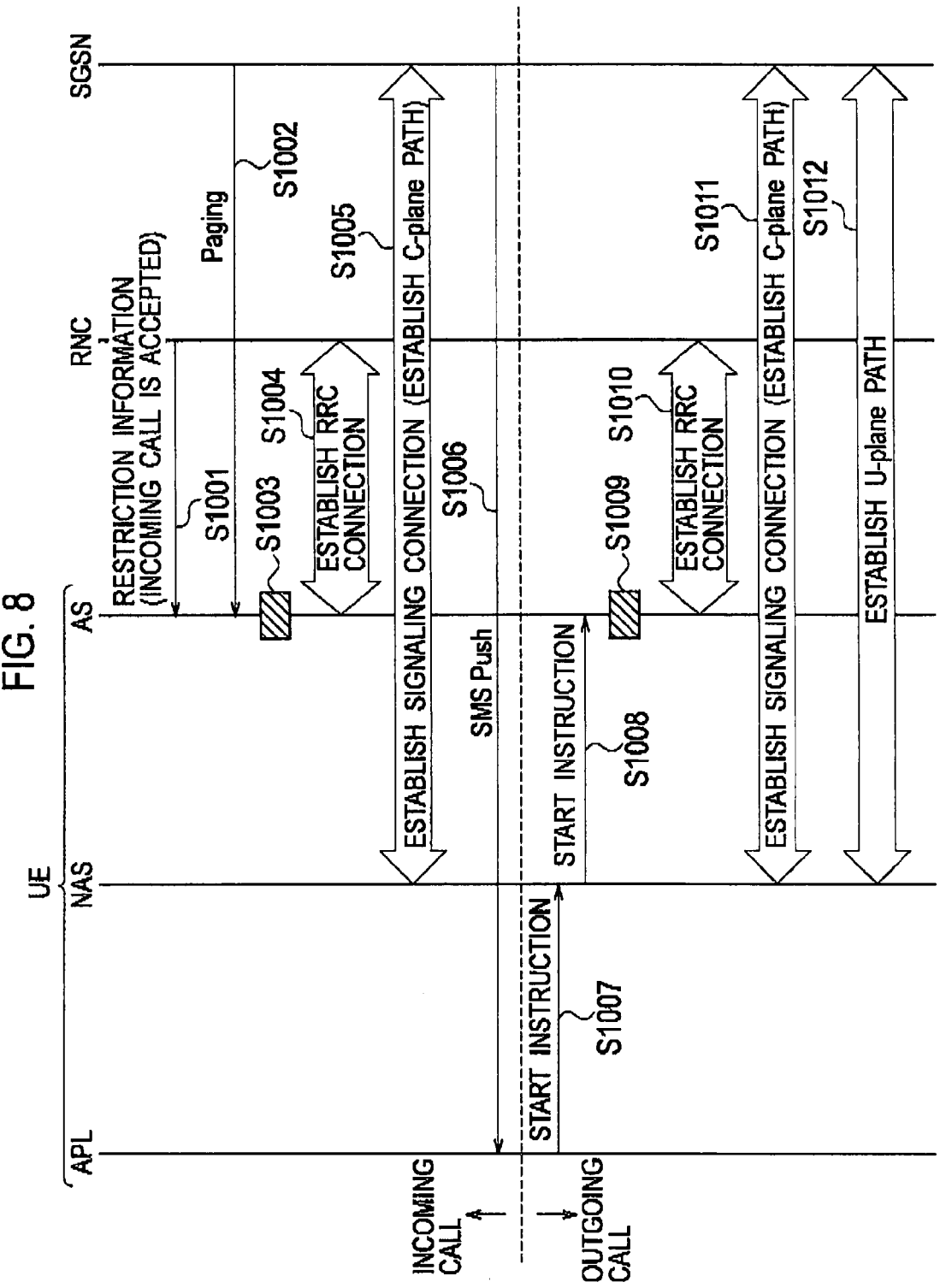
FIG. 8 is a sequence diagram showing an incoming call processing of a mobile communication system according to the first embodiment of the present invention when an outgoing call is restricted.

With reference to FIG. 8, a description will be given of operations of the packet communication system according to the first embodiment of the present invention.

Specifically, with reference to FIG. 8, a description will be given of the operations of the mobile station UE#1 for performing packet communications in response to an incoming call for the mobile station UE#1 when congestion occurs in the packet exchange SGSN, in the packet communication system according to this embodiment.

As shown in FIG. 8, in Step S1001, when detecting congestion in the packet exchange SGSN, the radio network controller RNC informs the mobile station UE#1 of restriction information for accepting an incoming call while restricting an outgoing call, namely, for restricting only PS calling. Here, the AS function of the mobile station UE#1 receives and stores the restriction information.

In Step S1002, the packet exchange SGSN sends paging to notify the mobile station UE#1 of the presence of an incoming call for the mobile station UE#1.

When noticing, in Step S1003, that the paging sent by the packet exchange SGSN is for the mobile station UE#1 and that the incoming of the paging is accepted in the mobile station UE#1 on the basis of the restriction information, the AS function of the mobile station UE#1 establishes an RRC connection with the radio network controller RNC in Step S1004.

In Step S1005, the NAS functions of the mobile station UE#1 establishes a C-plane path with the packet exchange SGSN.

In Step S1006, the packet exchange SGSN sends an "SMS Push" to the mobile station UE#1 via the C-plane path. The "SMS Push" is a message for instructing the mobile station UE#1 to establish a U-plane path with the packet exchange SGSN.

In Step S1007, in response to the incoming of the "SMS Push" sent by the packet exchange SGSN, the APL function of the mobile station UE#1 sends a "start instruction" to the NAS function of the mobile station UE#1. The "start instruction" instructs the NAS function of the mobile station UE#1 to establish a U-plane path with the packet exchange SGSN. Then, in Step S1008, the NAS function of the mobile station UE#1 sends the "start instruction" to the AS function of the mobile station UE#1.

In Step S1009, only the PS calling is restricted in the mobile station UE#1 with the UE class of "5". However, since the "start instruction" is generated due to the "SMS Push", the AS function of the mobile station UE#1 can call to the packet exchange SGSN. Thereby, in Step S1010, the AS function of the mobile station UE#1 can establish an RRC connection with the radio network controller RNC.

In Step S1010, when the C-plane path established in Step S1005 is now released, the NAS function of the mobile station UE#1 establishes a C-plane path with the packet exchange SGSN.

In Step S1011, the NAS function of the mobile station UE#1 establishes a U-plane path with the packet exchange SGSN. The mobile station UE#1 performs packet communications using the U-plane path thus established.

(Advantageous Effects of Packet Communication System According to First Embodiment of Present Invention)

The packet communication system according to the first embodiment of the present invention is configured in such a way that, the mobile station UE can call to the packet exchange SGSN when receiving the "SMS Push" for instructing the mobile station UE to establish a U-plane path with the packet exchange SGSN, even if having received restriction information for accepting an incoming call while restricting an outgoing call. Accordingly, it is possible to solve the problem that the mobile station UE cannot start packet communications in response to the incoming call for the mobile station UE even though the incoming call is accepted.

Modified Example 1

Figure 9:
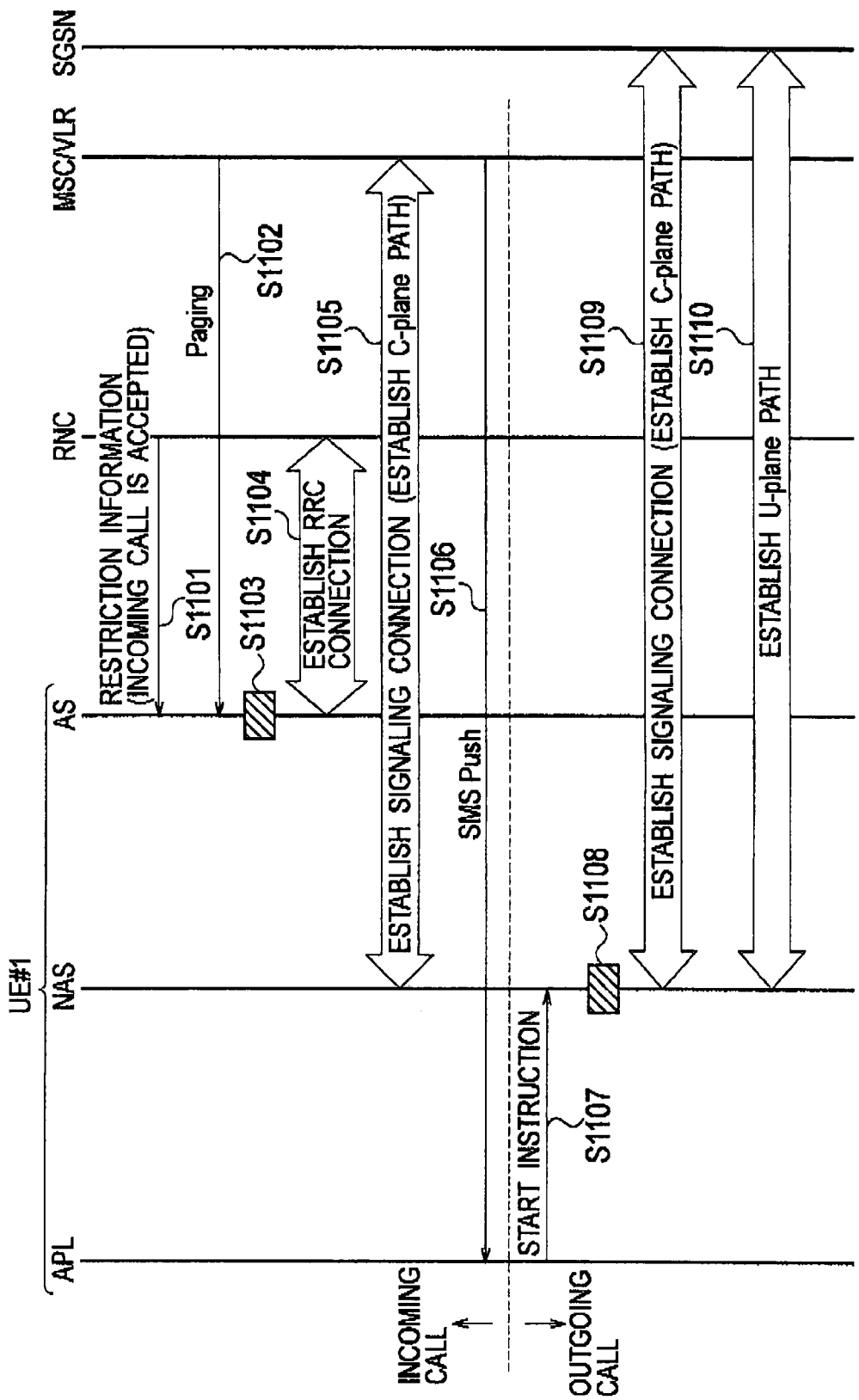
FIG. 9 is a sequence diagram showing an incoming call processing of a mobile communication system according to a modified example 1 of the present invention when an outgoing call is restricted.

With reference to FIG. 9, a mobile communication system according to a modified example 1 of the present invention will be described. Hereinafter, the mobile communication system according to the modified example 1 will be described focusing on differences from the mobile communication system according to the first embodiment described above.

Specifically, with reference to FIG. 9, a description will be given of operations of a mobile station UE#1 for performing packet communications in response to an incoming call for the mobile station UE#1 when congestion occurs in a packet exchange SGSN, in the packet communication system according to this modified example.

Figure 4:
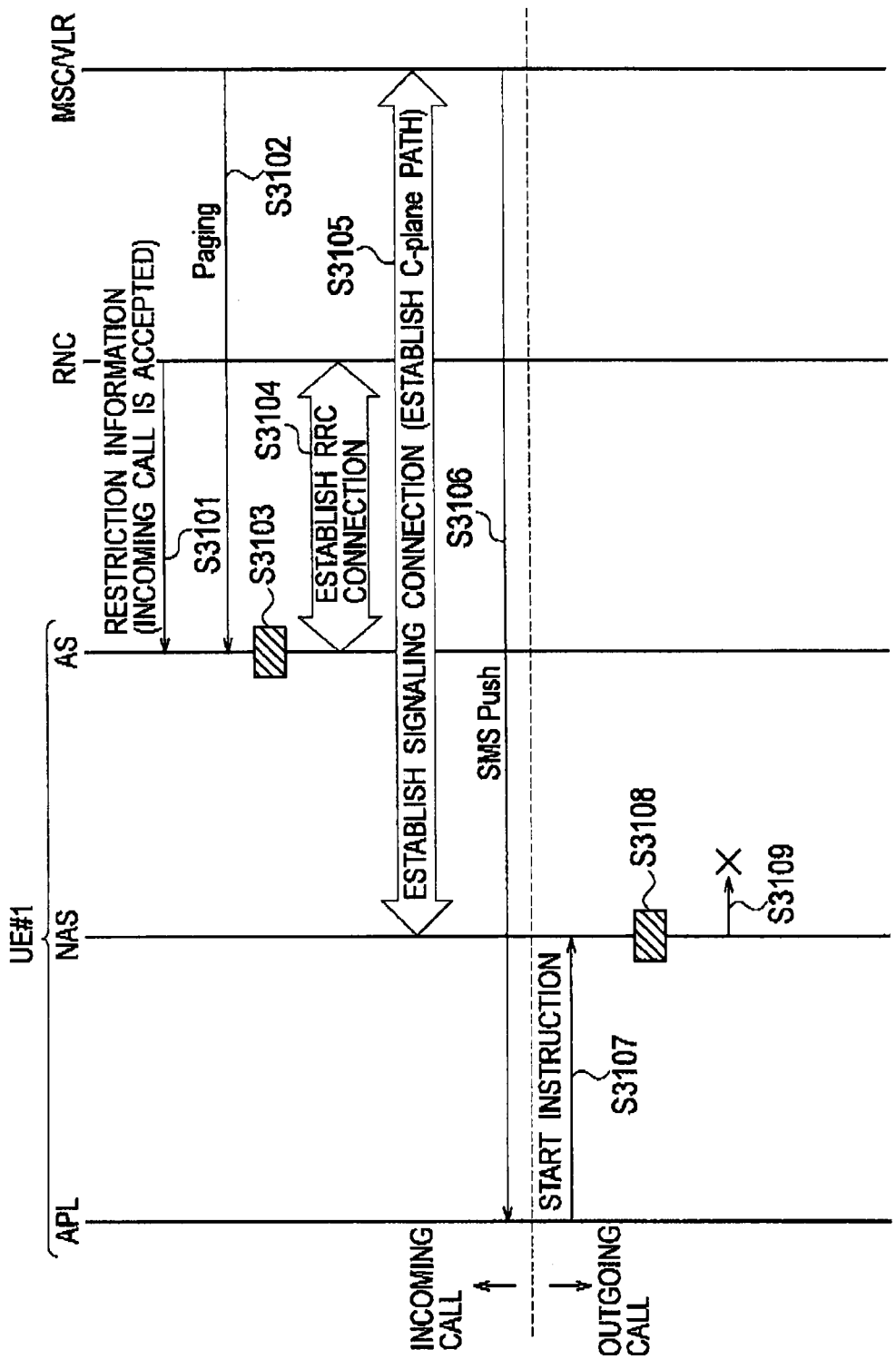
FIG. 4 is a sequence diagram showing an incoming call processing of the conventional mobile communication system when an outgoing call is restricted.
Figure 5:
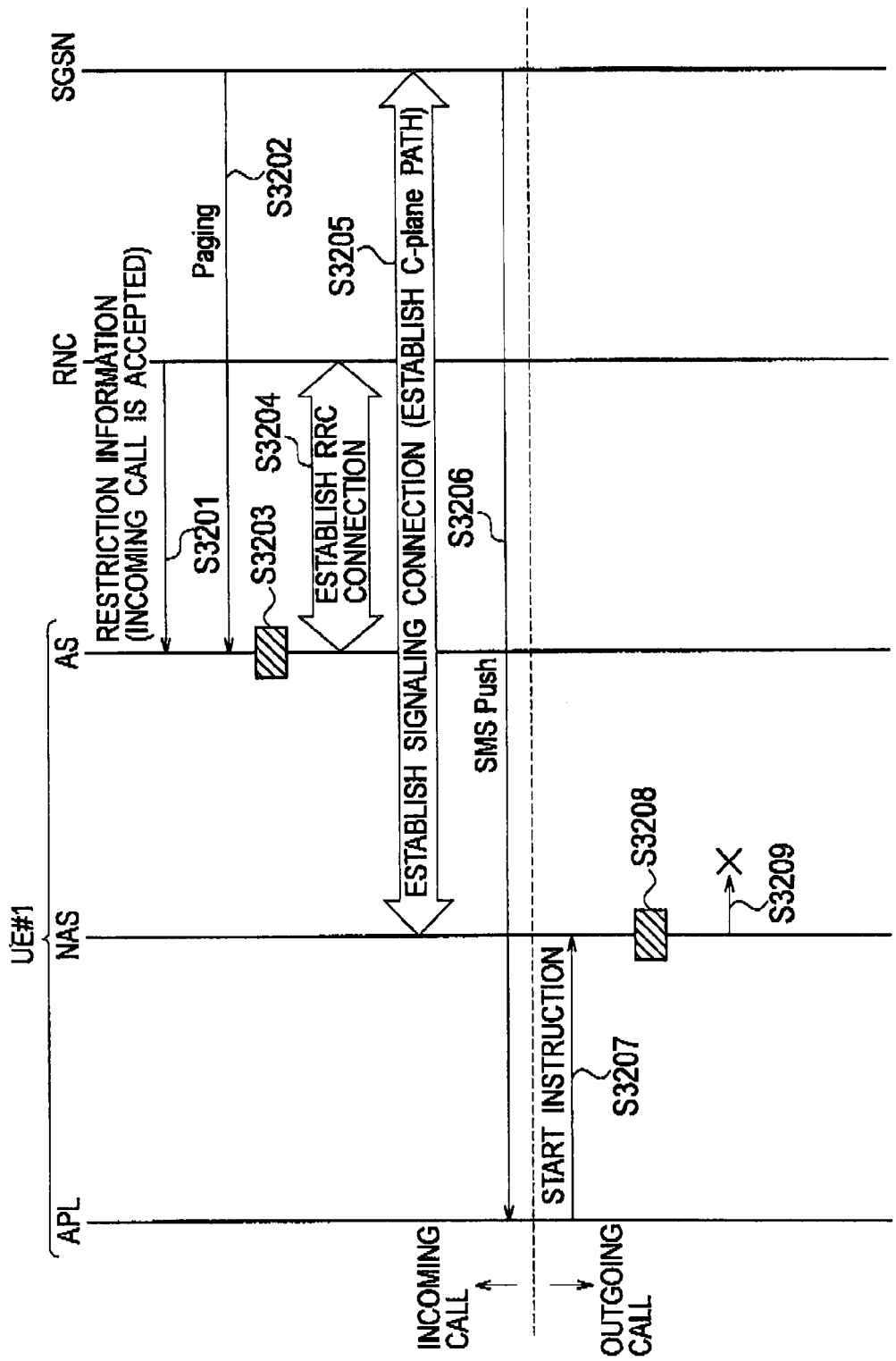
FIG. 5 is a sequence diagram showing an incoming call processing of the conventional mobile communication system when an outgoing call is restricted.

As shown in FIG. 9, operations of Steps S1101 to S1106 are the same as those of Steps S3101 to S3106 in FIG. 4 described above, and therefore descriptions thereof will be omitted.

Note that, in the mobile communication system of the modified example 1, assume that an "SMS Push" is sent from a CS domain while a response to the "SMS Push" is sent to a PS domain.

In Step S1107, in response to an incoming of an "SMS Push" sent by a circuit exchange MSC/VLR, an APL function of the mobile station UE#1 sends a "start instruction" to a NAS function of the mobile station UE#1. The "start instruction" instructs the WAS function of the mobile station UE#1 to establish a U-plane path with the packet exchange SGSN.

In Step S1108, the NAS function of the mobile station UE#1 notices that only PS calling is restricted in the mobile station UE#1 with the UE class of "5", and that an RRC connection is established with a radio network controller RNC. Thus, in the conventional system, the NAS function of the mobile station UE#1 cannot establish a C-plane path with the packet exchange SGSN.

Even in such a case, in the mobile communication system according to the modified example 1, the NAS function of the mobile station UE#1 can call to the packet exchange SGSN, when judging that the "start instruction" thus received is generated due to the "SMS Push". Hence, the NAS function of the mobile station UE#1 can establish a C-plane path with the packet exchange SGSN in Step S1109.

In Step S1110, the NAS function of the mobile station UE#1 establishes a U-plane path with the packet exchange SGSN. The mobile station UE#1 performs packet communications using the U-plane path thus established.

Modified Example 2

With reference to FIG. 10, a mobile communication system according to a modified example 2 of the present invention will be described. Hereinafter, the mobile communication system according to the modified example 2 will be described focusing on differences from the mobile communication system according to the first embodiment described above.

Specifically, with reference to FIG. 10, a description will be given of operations of a mobile station UE#1 for performing packet communications in response to an incoming call for the mobile station UE#1 when congestion occurs in a packet exchange SGSN, in the packet communication system according to this modified example.

As shown in FIG. 10, operations of Steps S1201 to S1206 are the same as those of Steps S1001 to S1006 in FIG. 8 described above, and therefore descriptions thereof will be omitted.

In Step S1207, in response to an incoming of an "SMS Push" sent by the packet exchange SGSN, an AFL function of the mobile station UE#1 sends a "start instruction" to NAS function of the mobile station UE#1 by using a C-plane path having established with the packet exchange SGSN. The "start instruction" instructs the NAS function of the mobile station UE#1 to establish a U-plane path with the packet exchange SGSN.

In Step S1208, the NAS function of the mobile station UE#1 notices that only PS transmission is restricted in the mobile station UE#1 with the UE class of "5," and that the C-plane path is established with the packet exchange SGSN. Thus, in the conventional system, the NAS function of the mobile station UE#1 cannot establish a U-plane path with the packet exchange SGSN.

Even in such a case, in the mobile communication system according to the modified example 2, the NAS function of the mobile station UE#1 can call to the packet exchange SGSN, when judging that the "start instruction" thus received is generated due to am "SMS Push". Hence, the NAS function of the mobile station UE#1 can establish a U-plane path with the packet exchange SGSN in Step S1209. The mobile station UE#1 performs packet communications using the U-plane path thus established.

In the embodiment described above, a description has been given by taking, as an example, the mobile communication system using the "GSM standard" including the "GERAN (GSM EDGE Radio Access Network)" and the "GPRS (General Packet Radio Services)", the "UMTS standard" including the "UTRAN (UMTS Terrestrial Radio Access Network)" and the "GPRS", for example. However, the present invention is also applicable to a mobile communication system using the "LTE (Long Term Evolution)/SAE (system architecture evolution) standard". In essence, the present invention is applicable to any mobile communication system using an "SMS Push".

Note that, the entire content of Japanese Patent Application No. 2006-278174 (filed on Oct. 11, 2006) is incorporated herein by reference.

INDUSTRIAL APPLICABILITY

As has been described above, the packet communication method and the mobile station according to the present invention allow the mobile station UE#1 to start packet communications in response to an incoming call for the mobile station UE#1, even when the mobile station UE#1 has received restriction information for accepting an incoming call while restricting an outgoing call, in the packet communication system in which the mobile station UE#1 is configured to start packet communications by calling to the packet exchange SGSN, after receiving paging for notifying the mobile station UE#1 of the presence of an incoming call for the mobile station UE#1. Thus, the present invention is advantageous in radio communications such as mobile communications.

The invention claimed is:

1. A packet communication method for performing packet communications via a data path established between a mobile station and a packet exchange, the method comprising the steps of:
   receiving, at the mobile station, restriction information when an external device determines that the mobile station requires restriction on at least making an outgoing call;
   receiving, at the mobile station, an incoming paging signal from the packet exchange;
   establishing, at the mobile station, a control path with the packet exchange in response to the incoming paging signal for the mobile station;
   sending, from the packet exchange, a message to the mobile station via the control path, the message instructing the mobile station to establish the data path with the packet exchange;
   establishing, at the mobile station, the data path with the packet exchange by calling to the packet exchange, when the mobile station receives the message after the mobile station has received the restriction information and the paging signal and when the restriction information indicates that the mobile station can accept an incoming call but not make an outgoing call;
   establishing, at the mobile station, the data path with the packet exchange by calling to the packet exchange, when the mobile station receives the message and when the mobile station has not received any restriction information; and
   restricting, at the mobile station, establishment of the data path with the packet exchange, when the mobile station receives restriction information indicating that the mobile station is restricted from accepting an incoming call and making an outgoing call.

2. The method according to claim 1, wherein the control path is a C-plane path, the message sent from the packet exchange is a SMS (Short Message Service) push message, and the data path is a U-plane path.

3. A mobile station configured to perform packet communications via a data path established with a packet exchange, the mobile station comprising:
- a restriction information receiver configured to receive restriction information when an external device determines that the mobile station requires restriction on at least making an outgoing call;
- a paging receiver configured to receive an incoming paging signal from the packet exchange;
- a control path establisher configured to establish a control path with the packet exchange in response to the incoming paging signal for the mobile station; and
- a data path establisher configured to establish the data path with the packet exchange by calling to the packet exchange, wherein the data path establisher is configured to establish the data path with the packet exchange by calling to the packet exchange, when the data path establisher receives a message instructing the mobile station to establish the data path with the packet exchange after the restriction information receiver has received the restriction information and the paging signal and when the restriction information indicates that the mobile station can accept an incoming call but not make an outgoing call, the data path establisher is configured to establish the data path with the packet exchange by calling to the packet exchange, when the data path establisher receives the message and when the restriction information receiver has not received any restriction information; and the data path establisher is restricted from establishing the data path with the packet exchange, when the data path establisher receives restriction information indicating that the mobile station is restricted from accepting an incoming call and making an outgoing call.

4. The mobile station according to claim 3, wherein
the restriction information includes an access class indicating a type of a mobile station for which an outgoing call to the packet exchange is to be restricted.

* * * * *